United States Patent
Virtanen et al.

(10) Patent No.: US 6,400,939 B1
(45) Date of Patent: Jun. 4, 2002

(54) METHOD FOR LIMITING USE OF TERMINAL EQUIPMENTS

(75) Inventors: Olli-Pekka Virtanen, Vesilahti; Keijo Ekola, Tampere, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/469,839

(22) Filed: Dec. 21, 1999

Related U.S. Application Data

(63) Continuation of application No. PCT/FI98/00526, filed on Jun. 17, 1998.

(30) Foreign Application Priority Data

Jun. 23, 1997 (FI) .................................................. 972701

(51) Int. Cl.$^7$ ............................................... H04M 1/66
(52) U.S. Cl. ..................... 455/410; 455/456; 379/112; 370/328
(58) Field of Search ................................ 455/433, 456, 455/410; 379/112; 370/328; 340/439

(56) References Cited

U.S. PATENT DOCUMENTS

| | | | |
|---|---|---|---|
| 5,504,803 A | * 4/1996 | Yamada et al. | |
| 5,537,460 A | * 7/1996 | Holliday et al. | |
| 5,579,379 A | * 11/1996 | D'Amico et al. | 379/112 |
| 5,610,969 A | * 3/1997 | McHenry et al. | |
| 5,825,283 A | * 10/1998 | Cambi | 340/438 |
| 6,011,975 A | * 1/2000 | Emry et al. | 455/456 |
| 6,148,192 A | * 11/2000 | Ahvenainen | 455/410 |
| 6,198,933 B1 | * 3/2001 | Lundin | 455/456 |
| 6,208,627 B1 | * 3/2001 | Menon et al. | 370/328 |

FOREIGN PATENT DOCUMENTS

| | | |
|---|---|---|
| EP | 0 757 502 | 2/1997 |
| WO | WO 94/13115 | 6/1994 |
| WO | WO-96/35304 | * 11/1996 |
| WO | WO 96/36194 | 11/1996 |
| WO | WO 97/35417 | 9/1997 |
| WO | WO 98/59514 | 12/1998 |

* cited by examiner

Primary Examiner—William Cumming
(74) Attorney, Agent, or Firm—Altera Law Group, LLC

(57) ABSTRACT

The invention relates to a method for limiting terminal equipment use of home subscribers of a network in a telecommunications system in which each subscriber has a subscriber identity and with each terminal equipment is associated an equipment identity. In the method, by which the operator can, if desired, supervise the terminal equipments used in the network by the home subscribers, a home equipment register is maintained about the terminal equipments allowed to the home subscribers of the network; a subscriber identity of the user is received from the terminal equipment; an equipment identity is received from the terminal equipment; on the basis of the subscriber identity it is checked whether the subscriber is a home subscriber of the network, and if so, the home equipment list of the network is checked to see whether the terminal equipment is an allowed one, and if the terminal equipment is not an allowed equipment, the use of the equipment is limited. The invention also relates to an equipment register in which the method of the invention can be applied. The invention further relates to a mobile system in which the method and equipment register of the invention can be used.

1 Claim, 5 Drawing Sheets

METHOD FOR LIMITING USE OF TERMINAL EQUIPMENTS

This application is a continuation of PCT/FI98/00526 filed Jun. 17, 1998.

BACKGROUND OF THE INVENTION

The invention relates to limitation of terminal equipment use of home subscribers of a network in a telecommunications system, and particularly to limitation of the use of mobile stations of a mobile system.

In most data transmission systems supporting subscriber mobility, subscribers and terminal equipments are not fixedly assigned to each other; instead, subscriber-specific subscriber identity modules and individual equipment identities for differentiating between terminal equipments are used. Examples for a data transmission system like this are the digital Pan-European cellular radio system GSM (Global System for Mobile Communications), and derivatives of the GSM.

An identity module used for identifying the subscriber, e.g. a SIM card (Subscriber Identity Module) used in the GSM, is a processor card or smart card positioned in a terminal equipment. The card enables the subscriber to use the card-controlled terminal equipment, and it contains e.g. information helping to identify the subscriber, e.g. a number identifying a mobile station subscriber. An example for an identity like this is an IMSI (International Mobile Subscriber Identity) used in the GSM, the IMSI comprising a land code for mobile communication, a mobile network identity, and a mobile subscriber identity.

To identify a terminal equipment, an identity identifying the terminal equipment stored in the terminal during the manufacture is transmitted to the network. An example for an identity like this is an IMEI (International Mobile Equipment Identity) used in the GSM, the IMEI comprising a type approval code, a manufacturer's code, and a serial number.

Mobile networks comprise a facility in which an equipment identity of a terminal equipment used by a subscriber, i.e. an IMEI in the GSM, is checked by inquiring the equipment identity of the subscriber. The equipment identity of the subscriber is checked, for example, to make sure that the terminal equipment concerned is not a stolen one or that the use of the equipment will not cause interference in the network. The equipment identity can be inquired of the subscriber e.g. always when the terminal equipment has established a connection with a mobile exchange, or in connection with location updating. The equipment identity of the subscriber is compared with information on equipment identities located in an Equipment Identity Register EIR or elsewhere in the mobile system, and as a result of the comparison, the use of the terminal equipment is either forbidden or allowed. The equipment identity register EIR of the GSM, for example, comprises lists of terminal equipment identities or series of such identities: a 'white list' of all the equipments allowed in the system, a 'black list' of all the equipments forbidden in the system, and a 'grey list' of all the equipments under supervision in the system. The maintenance of the lists in the system is centralised, and the operators can either use the lists directly or copy them in their own registers. The operators first check the black, then the grey and finally the white list.

In the above prior art mobile system in which a subscriber can make and receive phone calls at any terminal equipment of the system whatsoever, a problem arises when the operator wants to ensure that some or all of the home subscribers of the network use only terminal equipments sold or otherwise approved of by the operator in communication within the network of the operator.

The object of the invention is to solve the above problem and to provide a method by which the operator, if it so desires, can supervise the terminal equipments used by the home subscribers in the network of the operator. The object is achieved by a method according to the invention, which is characterized by maintaining a home equipment list of terminal equipments allowed to the home subscribers of the network; receiving from the terminal equipment a subscriber identity of the user; receiving from the terminal equipment an equipment identity; checking on the basis of the subscriber identity whether the subscriber is a home subscriber of the network, and if so, checking the home equipment list of the network to see whether the terminal equipment is an allowed one, and if the terminal equipment is not an allowed equipment, limiting the use of the equipment.

The invention also relates to an equipment register in which the method of the invention can be applied. An equipment register is part of a telecommunications system that comprises at least one network. The equipment register comprises reception means for receiving a terminal equipment check request form network infrastructure; comparison means for making a terminal equipment check: and response means for responding to the terminal equipment check request. The equipment register according to the invention is characterized in that it comprises, for at least one network, a home equipment list that contains information on the terminal equipments allowed to the home subscribers of the network; that in response to a terminal equipment check request concerning a home subscriber of the network, the comparison means are arranged to check the home equipment list of the network to see whether the terminal equipment is an allowed one; and that the response means are arranged to transmit a response to the network infrastructure, the response indicating the result of the check at least when the terminal equipment is riot on the home equipment list.

The invention also relates to a mobile system in which the method of the invention can be used. The mobile system comprises terminal equipments with individual equipment identities, subscribers with individual subscriber identities, and several networks each of which comprises at least one controller and means for receiving from a terminal equipment the equipment identity and the subscriber identity of the user. The mobile system according to the invention is characterized by comprising memory means that comprise, for at least one network, a home equipment list defining a group of equipment identities allowed to the home subscribers of the network, comparison means for comparing an equipment identity received from a home subscriber of the network with the equipment identities on the home equipment list in the memory means, and indication means for indicating an equipment identity lacking from the home equipment list.

The expression 'several networks' here means at least two different networks.

The invention improves the possibilities of a mobile system operator to supervise whether or not the home subscribers use terminal equipments approved of by the operator, and to treat them accordingly. If a terminal equipment is one that has not been approved of by the operator for the home subscribers, then the use of the terminal equipment can be prevented with the exception of emergency calls, or incoming calls may be allowed but outgoing calls forbidden or charged for extra. The invention thus gives the operator greater freedom to price both calls and terminal equipments: for example, a smaller charge for a call can be compensated for with more expensive terminal equipments.

Another advantage of the invention is that any changes needed for implementing the invention can be limited to a clearly defined area, mainly to software that controls a visitor location register and an equipment register. The implementation of the invention does not in any way disturb the operation of network elements to which the operation provided by the invention has not been added.

In addition, in a preferred embodiment of the invention in which equipment identities are connected with a subscriber identity, the operator has still greater freedom to set prices, since each subscriber can receive even more individual treatment. To some subscriber, even all terminal equipments allowed in the system can be allowed.

Preferred embodiments of a method, an equipment register and a mobile system according to the invention appear from attached dependent claims 2, 3, 5, 7 to 9.

BRIEF DESCRIPTION OF FIGURES

In the following, the invention will be described in greater detail by means of preferred embodiments, referring to the attached drawings, in which.

DETAILED DESCRIPTION OF INVENTION

Figure 1:
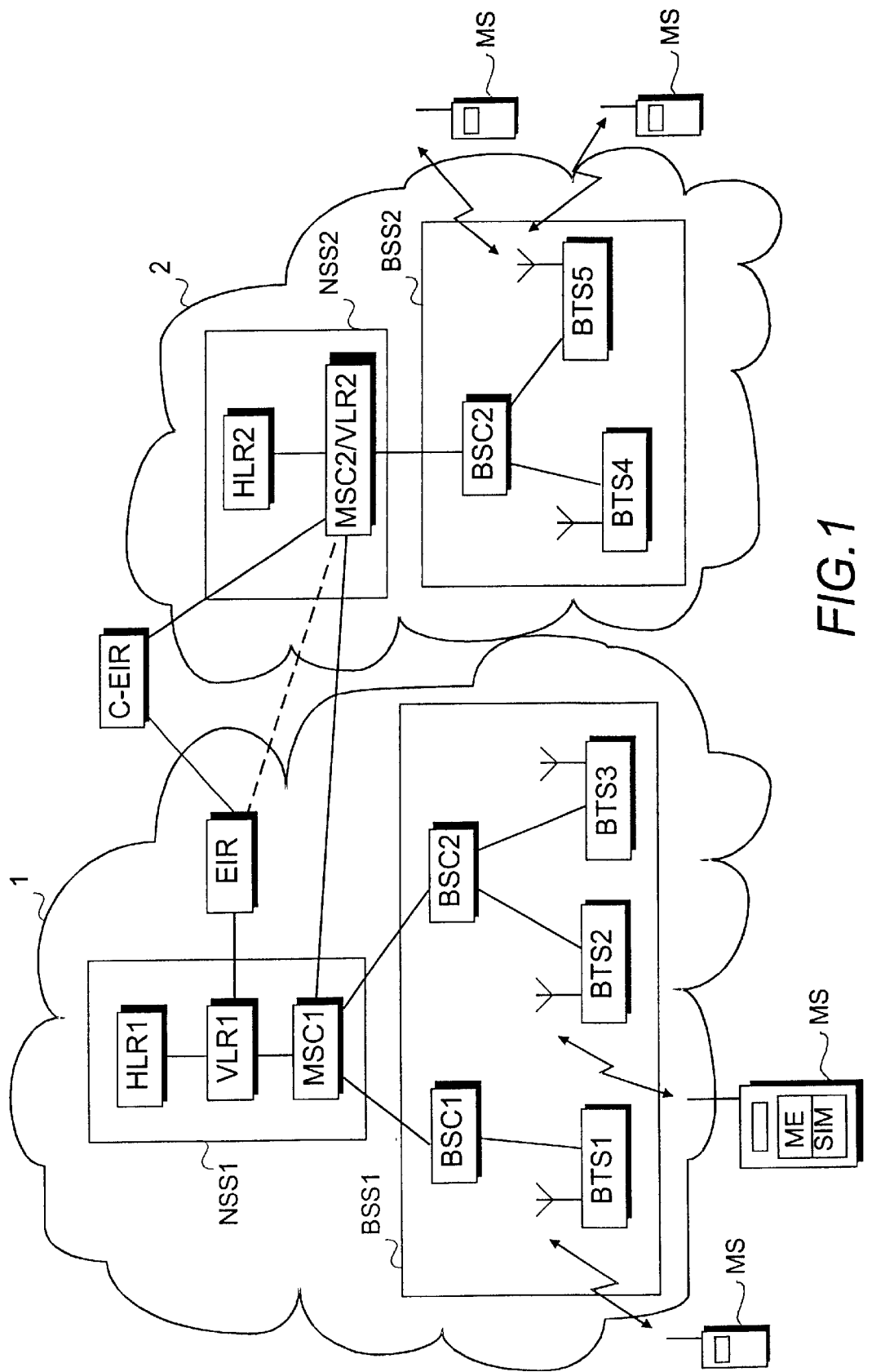
FIG. 1 shows those parts of a mobile system which are essential to the invention.

In the following the preferred embodiments of the invention will be described in the GSM system, but the invention is not to be understood as being limited to this radio system. The basic configuration of the GSM system appears from FIG. 1. The GSM network configuration comprises two parts: a Base Station Subsystem BSS and a Network Subsystem NSS. The BSS and mobile stations MS communicate via radio connections. In a base station subsystem BSS each cell is served by a Base Transceiver Station BTS. A group of base transceiver stations BTS is connected to a Base Station Controller BSC, whose function is to manage the radio frequencies and channels used by the base transceiver station BTS. The base station controllers BSC are connected to a Mobile Switching. Centre MSC. The function of a mobile switching centre MSC is to switch calls involving at least one mobile station MS. Some mobile switching centres MSC are connected to other telecommunication networks, such as the Public Switched Telephone Network PSTN, and they comprise transmission functions for switching calls to and from these networks. Such mobile switching centres are called gateway MSCs (not shown in the figure).

Two types of databases are associated with call routing. Subscriber information on all subscribers of the network are stored permanently or semi-permanently in a Home Location Register HLR, the information comprising information on the services that the subscriber has access to, and the current location of the subscriber. The other type of register is a Visitor Location Register VLR. A visitor location register VLR is usually associated with a single mobile switching centre MSC, but it may also serve several exchanges. A visitor location register VLR can be integrated into a mobile switching centre MSC. Such an integrated network element is called a visited mobile switching centre MSC/VLR. When a mobile station MS is active (it has registered in the network, and can make or receive calls), most of the subscriber information on the mobile station MS contained in the home location register HLR are loaded (copied) into the visitor location register VLR of the mobile switching centre MSC in the area of which the mobile station MS is.

In the GSM system serving as an example, a mobile station user is identified by a subscriber-specific identity module, or SIM card, which contains e.g. a subscriber identity IMSI. A particular terminal equipment is thus not assigned to a certain subscriber, but a terminal equipment is identified on the basis of an equipment identity IMEI. For information on terminal equipments, the system comprises an equipment register EIR. The equipment register EIR is connected to the network subsystem, and possibly also to other equipment registers. The GSM system comprises an international equipment register CEIR (Central EIR), from which the network can load information on equipment identities into its own equipment register EIR, or use the international equipment register CEIR. The system is designed so that all the equipment registers comprise the same equipment identity information. The network's own equipment register can also be integrated into the home location register HLR, or it can be integrated into some other register located in the network.

In an equipment register of the GSM system, an equipment identity is an IMEI, and equipment identity information is placed on separate lists having list identifiers. In the GSM system, list identifiers are colours, which naturally stand for e.g. numerical identifiers. The white colour is the list identifier of the list that comprises all the series of numbers containing the equipment identities that the operators using the same mobile system, i.e. here the GSM system, have allocated to those terminal equipments which can be used in the networks concerned. The series of numbers are presented by stating only the first few and last few numbers of the series, i.e. not by enlisting identities of individual terminal equipments. The list marked with the black colour or list identifier comprises the identities of all the terminal equipments that are to be forbidden the use of the mobile network and mobile station, e.g. because the terminal equipment concerned is defective and could cause interference in the mobile system, or because the terminal equipment in question is a stolen one. The grey colour or list identifier can indicate a list comprising the identities of terminal equipments whose operation is to be supervised in the mobile network, i.e. the identities of those equipments which may be defective and cause e.g. interference or unnecessarily load the mobile network. On the grey list can also be put equipments that are to be supervised since they are not yet relied on to function faultlessly.

In the GSM system and its derivatives, the register that the additional information according to the invention is stored in is an equipment register EIR in which a home equipment list is stored in, the form that will be described below. Alternatively, the home equipment list including identifying network identities can be stored in the international equipment register CEIR, or in both the EIR and the CEIR. In embodiments where a home subscriber list enumerates equipment identities specific for only some home subscribers of the network, information on the limitation in the use of the subscriber identity is stored in the subscriber information in the home location register HLR.

The mobile system shown in FIG. 1 comprises two separate networks, networks 1 and 2, and mobile stations MS freely roaming from one network to the other, the mobile stations comprising subscriber identity modules SIM and mobile equipments ME. Both networks comprise a base station subsystem BSS and a network subsystem NSS. Network 1 further comprises its own equipment register EIR, which is connected to the international equipment register CEIR. Network 2 is assumed to use the international equipment register CEIR, but it can also be connected to the equipment register EIR of network 1. The latter alternative is indicated by a dotted line in FIG. 1. Network 2 could also have an equipment register of its own. This alternative is not shown in FIG. 1.

Figure 2:
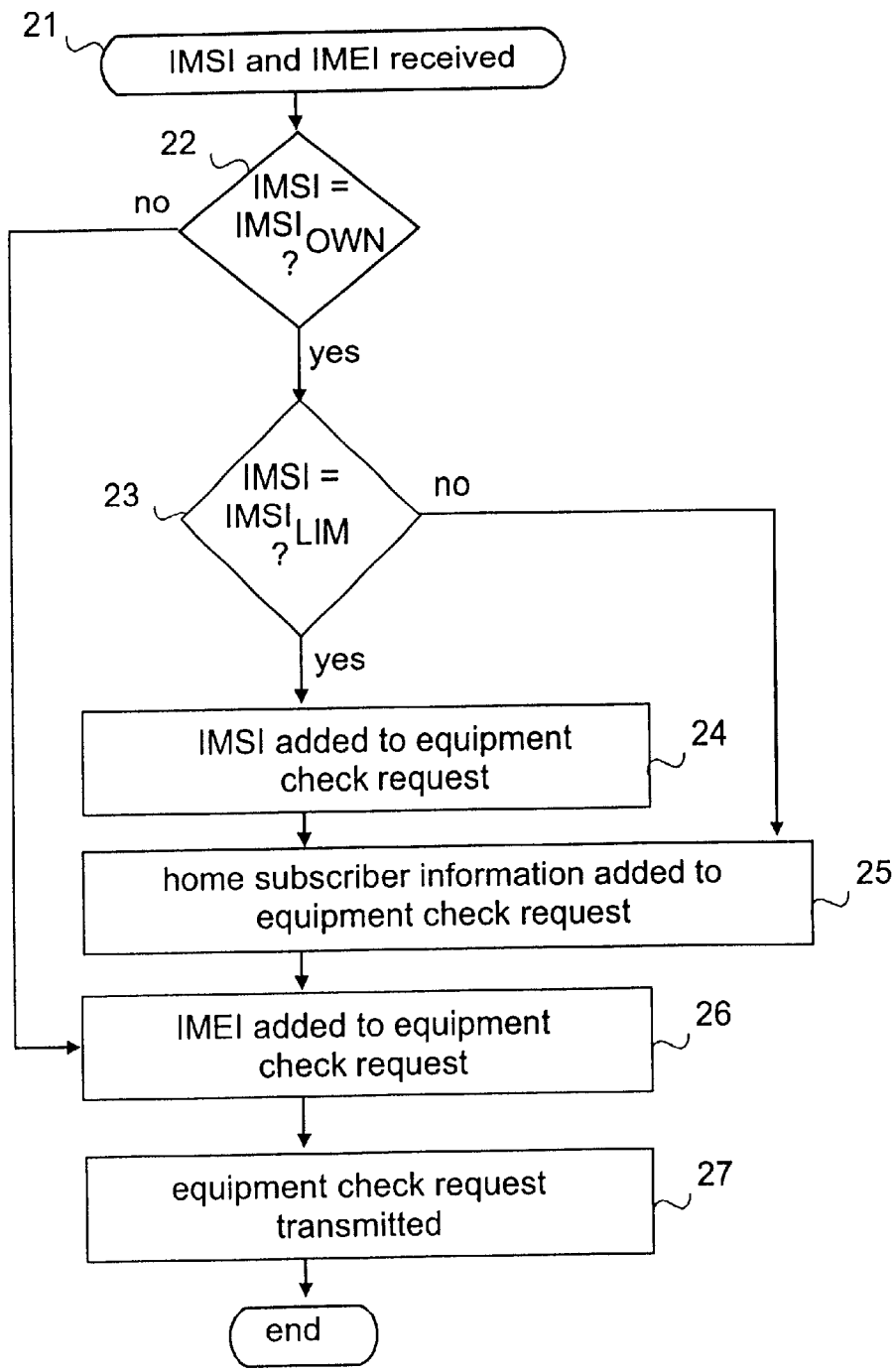
FIGS. 2 and 3 are flow diagrams illustrating a terminal equipment check according to the invention.

In the GSM system, the network operator itself can determine the network activity that triggers an equipment check. Depending on the implementation, the equipment check can be systematic, for example it can be carried out every time a radio channel is allocated, or it can be carried out only in certain situations, for example in connection with location updating or when an outgoing call is established. An equipment check is usually started by the visitor location register VLR. The flow diagram of FIG. 2 starts in a situation where e.g. location updating of a mobile station has triggered an equipment check, and a subscriber identity IMSI and equipment identity IMEI have been inquired of the mobile station accordingly. In block 21, the subscriber identity IMSI and equipment identity IMEI are received from the mobile station. They can be requested and received separately. If the subscriber identity IMSI is already known, it need not be inquired separately for the equipment check. In such a case, only the equipment identity IMEI has to be inquired. In block 22, it is checked whether the subscriber identity IMSI received is an IMSI of a home subscriber of the network, i.e. $IMSI_{OWN}$. Since the IMSI contains a network identity, it indicates the response. If the subscriber information is not found in the visitor location register VLR, it is retrieved from the home location register HLR. In FIG. 2 it is assumed that the subscriber information is in the visitor location register. If the subscriber is a home subscriber of the network, the subscriber information is checked in block 23 to see whether there are any limitations to the use of the subscriber identity, i.e. whether the $IMSI=IMSI_{LIM}$. A limited use of a subscriber identity here means that equipments (or equipment) that the subscriber is allowed to use have been defined separately for the subscriber identity concerned. If the use of the subscriber identity is limited, an IMSI is added to the equipment check request in block 24. The routine then proceeds to block 25, to which is transferred directly from block 23 if the use of the subscriber identity is not limited. In block 25, home subscriber information is added to the equipment check request. Separate home subscriber information is not necessarily needed, but the subscriber identity IMSI in the equipment check request can function as home subscriber information. After this, the routine proceeds to block 26, to which is transferred directly from block 22 if the subscriber identity IMSI received is not an IMSI of a home subscriber of the network, i.e. $IMSI_{OWN}$. The equipment identity IMEI received is added to the equipment check request in block 26, and in block 27 the equipment check request is transmitted.

An equipment check request according to the invention can also be assembled in some other way than what is shown in FIG. 2. Blocks 23 and 24 can be left out if an equipment check request concerning a home subscriber of the network always contains home subscriber information and an equipment identity IMEI, or alternatively blocks 23 and 25 can be left out, whereby an equipment check request concerning a home subscriber of the network always contains a subscriber identity IMSI and an equipment identity IMEI. Home subscriber information can also be included implicitly by sending an equipment check request concerning the home subscribers of the network as a separate message, as will be described in greater detail below in connection with FIG. 4.

Figure 3:
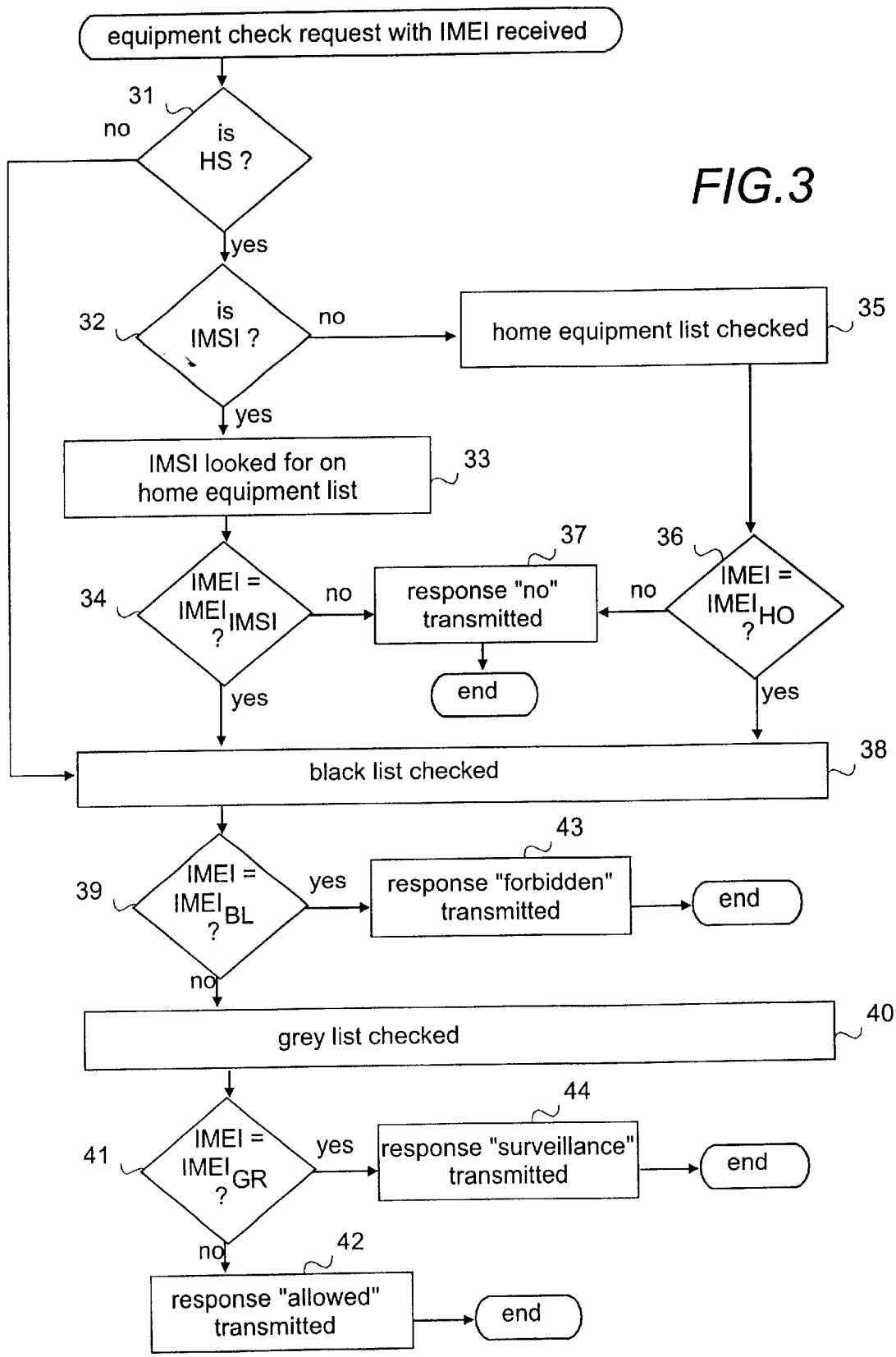

FIG. 3 starts in a situation in which an equipment check request, which naturally contains at least an equipment identity IMEI, is received. In this example it is assumed that the equipment check is carried out by an equipment register located in and containing the home subscriber list of the network itself. The invention, however, is not limited to solutions like this, but a home subscriber list can also be located elsewhere in the network or in an equipment register common to several networks. If the home subscriber list is in the common equipment register, an equipment check request concerning a home subscriber of the network must identify the network whose home equipment list is used.

With reference to FIG. 3, once the equipment check request has been received, it is checked (block 31) whether the subscriber is a home subscriber HS. If yes, it is checked (block 32) whether the request contains a subscriber identity IMSI. If yes, the IMSI is looked for (block 33) on the home equipment list. When the IMSI has been found, it is checked (block 34) whether the IMEI contained in the equipment check request is found among the equipment identities $IMEI_{IMSI}$ defined for this particular subscriber identity IMSI. If the equipment identity IMEI is found among the equipment identities defined for the subscriber identity, the equipment check is continued by checking the other lists in the equipment register, the contents of the lists being described in greater detail above in connection with FIG. 1. First the black list of the equipment register is checked (block 38) to see whether the IMEI received is an $IMEI_{BL}$ on the black list (block 39). This check could be omitted where a home subscriber is concerned, since terminal equipments on the black list should not be found among the 'allowed' equipments on the home subscriber list, either. The check, however, helps to ensure that information on the home equipment list that has inadvertently not been updated will not allow the use of a forbidden equipment. If the equipment is on the black list, the equipment check request is responded to (block 43) by stating that it is forbidden to use the equipment. If the equipment is not on the black list, the grey list is checked (block 40) to see whether the IMEI received is an $IMEI_{GR}$ found on the grey list (block 41). If the equipment is on the grey list, a response is formed (block 44) to the effect that the equipment is under supervision. If the equipment is not on the grey list, it is assumed to be on the white list, and the equipment check request is responded to (block 42) by stating that the equipment is an allowed one. It is also possible to check the white list separately.

If the equipment identity IMEI received is not defined in the equipment identities $IMSI_{IMEI}$ of the subscriber identity (block 34), the equipment check request is responded to by stating that the equipment is not on the home equipment list (block 37). After this, the equipment check can be stopped or, depending on the embodiment, it can be continued in the above-described manner from block 38 onward. If the equipment check is continued, information stating that the equipment is not on the home equipment list is included in the response.

If the equipment check request concerns a home subscriber (block 31), and if the request does not contain a subscriber identity IMSI (block 32), the home equipment list is checked (block 35) to see whether the equipment identity IMEI received is an equipment identity $IMEI_{HO}$ (block 36) found on the home equipment list. If the equipment identity is on the home equipment list, the routine continues in block 38, where the black list is checked in the above manner. If one does not want to check the black list, the checking will continue in block 40 with the checking of the grey list. If the equipment identity is not found on the home equipment list (block 36), the equipment check request is responded to by stating that the equipment is not on the home equipment list (block 37). The equipment check can then be stopped or, depending on the embodiment, it can be continued in the above-described manner from block 38 onward. If the equipment check is continued, information stating that the equipment is not on the home equipment list is included in the response.

If the equipment check request does not concern a home subscriber (block 31), the check is carried out normally, starting from block 38 with the checking of the black list. The routine continues in the manner described above.

An equipment check according to the invention can also be carried out in some other way than what has been described above. For example, if an equipment check request concerning a home subscriber of the network always contains information indicating that the subscriber is a home subscriber, then blocks 32, 33 and 34 described in connection with FIG. 3 are not needed. Correspondingly, if an equipment check request concerning a home subscriber of the network always contains a subscriber identity IMSI, and if the home equipment list contains only equipment identities IMEI defined per each subscriber identity, blocks 31 and 32 can be combined to form a single question, i.e. whether the subscriber is a home subscriber, and blocks 35 and 36 can be omitted as being unnecessary.

Figure 4:
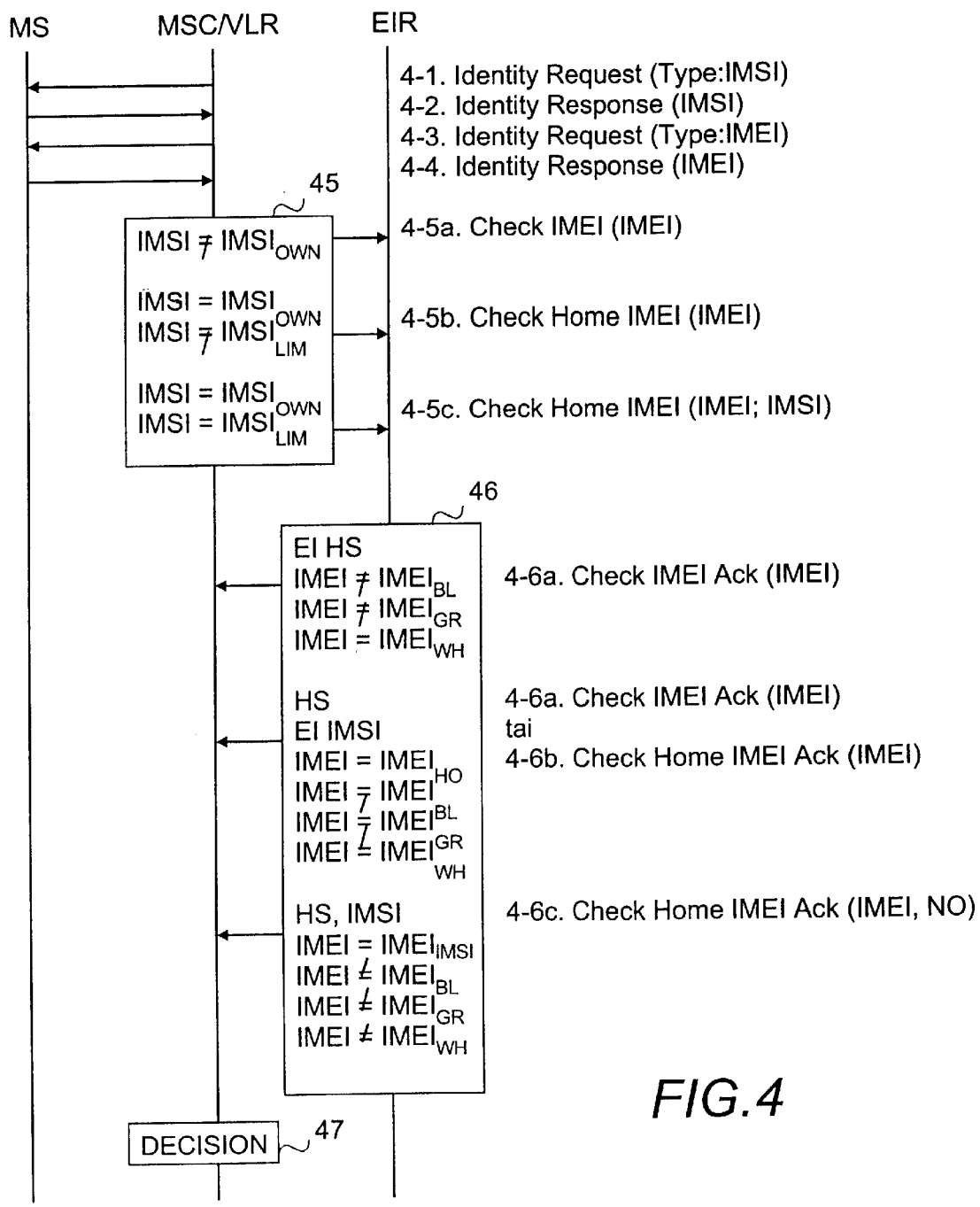
FIG. 4 is a signalling diagram illustrating an equipment check according to the invention.

FIG. 4 is a signalling diagram illustrating an equipment check according to the invention from the point of view of the signalling between the network elements when the condition triggering the equipment check has been met. Even in this example it is assumed that the network has an equipment register of its own. If the network uses the common equipment register, messages 4-5b and 4-5c must be provided with information indicating the network whose home equipment list is being checked. A visitor location register MSC/VLR sends a subscriber identity request 4-1 (Identity Request(Type:IMSI)) to a mobile station MS, which responds by sending a subscriber identity IMSI 4-2 (Identity Response(IMSI)). The visitor location register MSC/VLR then sends an equipment check request 4-3 (Identity Request(Type:IMEI)) to the mobile station MS, which responds by sending an equipment identity IMEI 4-4 (Identity Response(IMEI)). The steps indicated by reference number 45 correspond to the tests conducted in blocks 22 and 23 in FIG. 2. Depending on the test and the embodiment, the visitor location register MSC/VLR sends an equipment register EIR either a normal equipment check request 4-5a (Check IMEI(IMEI)), an equipment check request 4-5b concerning a home subscriber of the network (Check Home IMEI(IMEI)), or an equipment check request 4-5c concerning a home subscriber of the network and containing a subscriber identity IMSI (Check Home IMEI(IMEI, IMSI)). The steps indicated by reference number 46 correspond to the tests conducted in blocks 31, 32, 34 or 36, 39 and 41 in FIG. 3. In addition, it is checked whether the equipment is found on the white list or not, i.e. is IMEI=IMEI$_{WH}$. The figure and the signalling messages illustrate only some of the different response combinations indicating the changes required in the signalling by the invention. When all the lists show that the use of the equipment is allowed, the visitor location register is sent a positive acknowledgement 4-6a (Check IMEI (Ack(IMEI)). When the acknowledgement concerns a home subscriber of the network, it can also be of the form 4-6b (Check Home IMEI Ack(IMEI)). If an equipment used by a home subscriber of the network has not been defined for the subscriber concerned but it passes the other tests, the visitor location register can be sent an acknowledgement 4-6c (Check Home IMEI Ack(IMEI, NO), which contains information indicating that the equipment has not been defined as being allowed to a home subscriber of the network. A similar message can also be transmitted when a test according to block 36 in FIG. 3 is conducted. Alternatively, a message forbidding the use of the equipment could be sent. Reference number 47 here indicates a decision reached by the visitor location register MSC/VLR after reception of a message containing an acknowledgement. If the use of the equipment is allowed, the network activity—e.g. location updating—that has triggered the equipment check is accepted. If the visitor location register receives message 4-6c, the decision depends on the definition of the operator. The use of the equipment may be forbidden with the exception of emergency calls, the calls can be charged triple the normal price, only incoming calls may be allowed, only outgoing calls to the home network may be allowed., etc. The invention gives the operator great freedom to limit the use of terminal equipments that are not allowed to the home subscribers of the network.

The signalling messages shown in FIG. 4 are presented only by way of an example, and the parameters and names of the messages may differ from the above without that the information transmitted in the messages changes. For example, message 4-5b could be of the form 'Check IMEI (IMEI, HPLMN)' where HPLMN could be a network identity on the basis of which the correct home equipment list could be found, or it could be a bit set on to indicate that it is a terminal equipment used by a home subscriber of the network that is being checked. Similarly, message 4-5c could be of the form 'Check IMEI (IMEI, IMSI)' where IMSI indicates that the terminal equipment check request concerns a home subscriber HS. The messages may also contain more information than what has been stated above.

Figure 5:
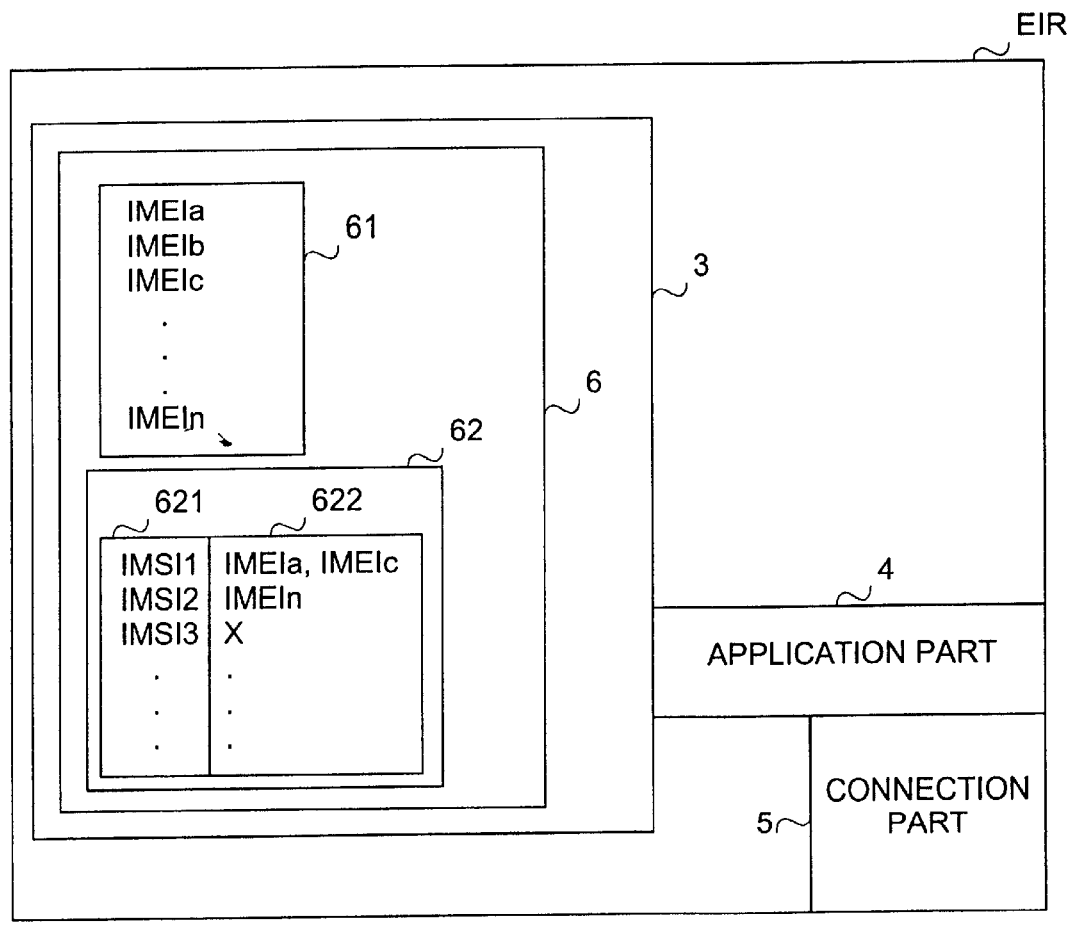
FIG. 5 is a block diagram showing an equipment register according to the invention.

FIG. 5 is a block diagram of an equipment register EIR according to the invention. The equipment register EIR comprises a database part 3, an application part 4, and a connection part 5. The database part 3 comprises at least one home equipment list 6, on which are defined the terminal equipments allowed to home subscribers of one network. The home equipment list 6 comprises at least one of lists 61 and 62. It may also comprise both. List 61 comprises the equipment identities IMEIa, IMEIb, IMEIc . . . IMEIn of the equipments that are allowed to the subscribers of the network, or series of numbers (not shown in the figure) representing the equipment identities, giving only the first few and the last few numbers of the series, i.e. not enlisting the identities of individual terminal equipments. List 62 enlists, per subscriber identity, the equipment identities of the terminal equipments allowed to the subscriber. The subscriber identities are shown in column 621 and the equipment identities are shown in column 622. For each subscriber identity on list 62, at least one equipment identity must be defined. The equipment identity can also be defined to be such that according to the home equipment list the equipment identity that is checked is always allowed. There is no upper limit to the number of identities. FIG. 5 shows a situation where list 62 defines two terminal equipments as being allowed to subscriber identity IMSI1, the equipments having identities IMEIa and IMEIc, and one terminal equipment IMEIn as being allowed to subscriber identity IMEI2, and subscriber identity IMEI3 has been given equipment identity X, which means that according to the home equipment list 6 all terminal equipments are allowed to the subscriber concerned. The list or lists of the home equipment list 6 may look different or be implemented differently from the figure, as long as the home equipment list 6 contains the information mentioned above. The database part 3 may comprise several home equipment lists 6, in which case the home equipment lists of different networks are separated from each other e.g. by a network identifier. The database part 3 can also comprise a black, grey, and/or white list (not shown in the figure), the contents of which have been presented in greater detail above in connection with FIG. 1.

Using the connection part 5, the equipment register EIR receives and sends messages and information to network infrastructure (the network subsystem NSS and base station subsystem BSS shown in FIG. 1) and to other equipment registers, and communicates with the network maintenance system (not shown in the figure).

The application part 4 detects an equipment check request, separates an equipment identity IMEI from the request, compares the IMEI with the contents of the lists in the database 3, and forms a response on the basis of the result of the comparison. The connection part 5 then forwards the response. The application part 4 of the equipment register EIR according to the invention can distinguish an equipment check request concerning the home subscribers of the network, and subsequently start the equipment check from the home equipment list 6 of the network. The application part 4 can also separate a subscriber identity IMSI from the equipment check request concerning a home subscriber of the network, and check the home equipment list 62 on the basis of the IMSI to see whether the equipment identity received in the equipment check request has been defined for the subscriber. If on the basis of the home equipment list 6 the equipment received in the equipment check request is not allowed to a home subscriber of the network, the application part 4 includes the negative information in the response. Depending on the embodiment, the application part 4 can also stop the equipment check if the home equipment list 6 indicates that the equipment identity is not allowed. The application part 4 can also include in the response information indicating that the home equipment list shows the equipment to be an allowed one.

The invention has been described above by using the identities IMSI and IMEI. These identities, however, are only intended to illustrate the operation of the invention, and the invention is not to be understood as being limited to the GSM system, nor to the identities IMSI and IMEI. It will be obvious to a person skilled in the art that with the advancement of technology, the basic idea of the invention can be implemented in may different ways. The invention and its embodiments are thus not limited to the above examples, but they can vary within the scope of the claims.

What is claimed is:

1. A method for limiting terminal equipment use of home subscribers of a network in a telecommunications system in which each subscriber has a subscriber identity and with each terminal equipment is associated an equipment identity, the method comprising the steps of:

maintaining a home equipment list of terminal equipments allowed to the home subscriber of the network, the home equipment list comprising for at least one home subscriber Identity at least one allowed equipment identity and enumerating a group of equipment identities allowed to the home subscribers of the network;

maintaining information, specific for the home subscribers, indicating whether the subscriber identity concerned is a limited identity to be used only in connection with equipment identities allowed to the subscriber identity concerned;

receiving from the terminal equipment a subscriber identity of the user, receiving from the terminal equipment an equipment identity;

checking on the basis of the subscriber identity whether the subscriber is a home subscriber of the network;

if the subscriber is a home subscriber, the method further comprises the steps of:

checking the information to see whether the subscriber identity concerned is a limited identity;

if the subscriber identity is a limited identity, checking the home equipment list on the basis of the subscriber identity to see whether the terminal equipment concerned is allowed to the subscriber identity concerned;

if the subscriber is a home subscriber without a limited identity, checking the group to see whether the terminal equipment is an allowed one; and if the terminal equipment is not an allowed equipment, limiting the use of the equipment.

* * * * *